(12) United States Patent
Keller et al.

(10) Patent No.: US 7,590,606 B1
(45) Date of Patent: Sep. 15, 2009

(54) MULTI-USER INVESTIGATION ORGANIZER

(75) Inventors: Richard M. Keller, San Francisco, CA (US); Tina L. Panontin, Mountain View, CA (US); Robert E. Carvalho, San Jose, CA (US); Ian Sturken, Morgan Hill, CA (US); James F. Williams, San Francisco, CA (US); Shawn R. Wolfe, Sunnyvale, CA (US); Yuri O. Gawdiak, Silver Spring, MD (US)

(73) Assignee: The United States of America as represented by the Administrator of the National Aeronautics and Space Administration (NASA), Washington, DC (US)

( * ) Notice: Subject to any disclaimer, the term of this patent is extended or adjusted under 35 U.S.C. 154(b) by 503 days.

(21) Appl. No.: 10/703,039

(22) Filed: Nov. 5, 2003

(51) Int. Cl.
*G06F 17/00* (2006.01)
*G06N 5/00* (2006.01)

(52) U.S. Cl. ..................................... 706/45
(58) Field of Classification Search ............... None
See application file for complete search history.

(56) References Cited

U.S. PATENT DOCUMENTS

| | | | | |
|---|---|---|---|---|
| 5,794,050 | A * | 8/1998 | Dahlgren et al. | 717/144 |
| 6,593,936 | B1 * | 7/2003 | Huang et al. | 345/619 |
| 7,185,049 | B1 * | 2/2007 | Benitez et al. | 709/203 |
| 7,313,534 | B2 * | 12/2007 | Scheer | 705/9 |
| 7,324,966 | B2 * | 1/2008 | Scheer | 705/28 |
| 7,373,355 | B2 * | 5/2008 | Hite et al. | 707/101 |
| 7,433,876 | B2 * | 10/2008 | Spivack et al. | 707/100 |
| 7,480,640 | B1 * | 1/2009 | Elad et al. | 706/14 |
| 7,490,094 | B2 * | 2/2009 | Bamba et al. | 707/100 |
| 7,493,333 | B2 * | 2/2009 | Hill et al. | 707/102 |
| 7,496,593 | B2 * | 2/2009 | Gardner et al. | 707/102 |
| 7,505,989 | B2 * | 3/2009 | Gardner et al. | 707/102 |
| 7,506,024 | B2 * | 3/2009 | Benitez et al. | 709/203 |

OTHER PUBLICATIONS

Assisted Ontology Instantiation: a LearningKit perspective Doherty, L.; Kumar, V.; Winne, P.; Advanced Learning Technologies, 2007. ICALT 2007. Seventh IEEE International Conference on Jul. 18-20, 2007 pp. 265-267 Digital Object Identifier 10.1109/ICALT.2007.75.*

(Continued)

*Primary Examiner*—Michael B Holmes
(74) *Attorney, Agent, or Firm*—John F. Schipper; Robert M. Padilla

(57) ABSTRACT

A system that allows a team of geographically dispersed users to collaboratively analyze a mishap event. The system includes a reconfigurable ontology, including instances that are related to and characterize the mishap, a semantic network that receives, indexes and stores, for retrieval, viewing and editing, the instances and links between the instances, a network browser interface for retrieving and viewing screens that present the instances and links to other instances and that allow editing thereof, and a rule-based inference engine, including a collection of rules associated with establishment of links between the instances. A possible conclusion arising from analysis of the mishap event may be characterized as one or more of: not a credible conclusion; an unlikely conclusion; a credible conclusion; conclusion needs analysis; conclusion needs supporting data; conclusion proposed to be closed; and an un-reviewed conclusion.

21 Claims, 14 Drawing Sheets

OTHER PUBLICATIONS

Ontology Instantiations for Software Engineering Knowledge Management Wongthongtham, P.; Chang, E.; Industrial Electronics, 2007. ISIE 2007. IEEE International Symposium on Jun. 4-7, 2007 pp. 1859-1863 Digital Object Identifier 10.1109/ISIE.2007.4374890.*

A formal ontology for re-use of software architecture documents Welty, C.A.; Ferrucci, D.A.; Automated Software Engineering, 1999. 14th IEEE International Conference on. Oct. 12-15, 1999 pp. 259-262 Digital Object Identifier 10.1109/ASE.1999.802304.*

Hospital care watch (HCW): an ontology and rule-based intelligent patient management assistant Payne, V.L.; Metzler, D.P.; Computer-Based Medical Systems, 2005. Proceedings. 18th IEEE Symposium on Jun. 23-24, 2005 pp. 479-484 Digital Object Identifier 10.1109/CBMS.2005.64.*

Berrios, et al., Developing a Web-based User Interface for Semantic Information Retrieval, Proceedings of ISWC 2003, Oct. 2003, 65-70, AAAI, Sanibel Island, FL.

Bozak, et al., KAON-towards a large scale semantic web, Proceedings of EC-Web 2002, LNCS, 2002, 304-313, Springer.

Corcho, et al., ODESeW. Automatic Generation . . . , The Semantic Web-ISWC 2003, http://www.springerlink.com/content/2kwjkaje66qx/?sortorder=asc&p_o=50, 2003, 802-817, Springer.

Jin, et al., OntoWebber: A Novel Approach for Managing Data on the Web, 18th International Conference on Data Engineering, Feb. 26, 2002-Mar. 1, 2002, 488-489, IEEE, San Jose, CA.

Maedche, et al., SEAL—A Framework for Developing SEmantic Web PortALs, 18th British Ntl. Conf. on Database, Jul. 9-11, 2001, 1-22, 2097, Springer Berlin/Heidelberg, Chilton, UK.

Spyns, et al., OntoWeb—a Semantic Web Community Portal, 4th International Conference on Practical Aspects of Knowledge Management, Jan. 21, 2003, 189-200, Springer Verlaf.

Stojanovic, et al.,SEAL-a framework for developing SEmantic portALS, 1st international conference on Knowledge capture, Oct. 22-23, 2001, 155-162, ACM, Victoria, BC, Canada.

Multilinear Events Sequencing Technology, The MES Investigation System, Mar. 15, 2003, 1-4, Sterling Software Ltd.

* cited by examiner

201 →
⊟ ☐ Blade attach fitting #1 (open all | close all)
 ⊕ ☐ Collected By (1 Investigators)
  ⊕ ☐ Man, Liam G.
 ⊕ ☐ Has Analysis (5 Analysis Report records)
  ⊕ ☐ Blade Attach Filling Load Analysis
  ⊕ ☐ Flange Crack Fatigue
  ⊕ ☐ Flange Safe Life
  ⊕ ☐ North Tunnel Incident Materials Analysis Report
  ⊕ ☐ North Tunnel Incident Prelim Material Analysis Report
 ⊕ ☐ Has Custodian (1 Investigators)
  ⊕ ☐ Man, Liam G.
 ⊕ ☐ Has Responsible Group (I Investigation Boards/0 Workgr
  ⊕ ☐ CRW Investigation Board
 ⊕ ☐ Part Of (1 systems)
  ⊕ ☐ Blade attach assembly #1
 ⊕ ☐ Pictured In (10 Photos)
  ⊕ ☐ AC97-0258-23
  ⊕ ☐ AC97-0258-24
  ⊕ ☐ AC97-0258-25
  ⊕ ☐ AC97-0258-30
  ⊕ ☐ AC97-0258-31
  ⊕ ☐ AC97-0258-32
  ⊕ ☐ AC97-0258-33
  ⊕ ☐ Hole A Damage 2470x.tiff
  ⊕ ☐ Hole A Fracture Surf. tiff
  ⊕ ☐ Retention Flange ustructure.tiff
 ⊕ ☐ Position Shown In (1 Scene Map)
  ⊕ ☐ Debris Map
 ⊕ ☐ Record For (1 Investigations)
  ⊕ ☐ Canard Rolor Wing (CRW) Incident
 ⊕ ☐ Supports (1 Hypotheses/0 Deduction)
  ⊕ ☐ Improper preload in bolts

201-L

---

Physical Evidence: Blade attach fitting #1
Item ID# 26975 updated 2003/07/10 09:08AM PDT by Smart, Matt
Send this item's web address via Email Refutes
Supports         ☐ Improper preload in bolts
Collected by     ☐ Man, Liam G.
Refers To
Responsible Group ☐ CRW Investigation Board
Record Creation Date   09/30/1997
Stored At
Record Update Time
Record Creation Time
Identifying_number    NW-6
Required Tests
Investigation    ☐ Canard Rotor Wing (CRW) Incident
Date of Last Record Update   10/15/1997
Record for phrase    Post-mishap
Record Location within   (E.g. drawer #6)
Impound Site    ☐ Man, Liam G.
Checked out to    09/27/1997
Date of Checkout
Time of Checkout   10/15/1997
Date of Return
Time of Return
Description    Upper part of rotor. Blades attached To
               The #1 blade attach assembly
Volume
Notes
Write Permission   ☐ CRW Shadow Team
Read Permission    ☐ CRW Shadow Team

SOME RULES FOR ESTABLISHMENT OF LINKS

1. If (1a) an informant operated a system under investigation and (1b) evidence indicates that the system failed during a mishap, then (2) the informant is a material witness.

2. If (1a) a link is applicable to a instance type and (1b) that instance type has instance sub-types, then (2) the link is applicable to each of the instance sub-types.

3. The named members (persons) of the Investigation Board are assembled for this mishap investigation.

4. A child of a instance that is closed is also closed.

5. A child of a Fault Tree instance whose closing is concurred in, is also closed.

6. A child of a Fault Tree child is changed to conform to a parent instance whose closure is proposed.

7. A top level proposed cause corresponds to a mishap root.

8. Place IO team members e-mails into a folder for the specific time period (e.g., day, week or month) the e-mail was received.

MULTI-USER INVESTIGATION ORGANIZER

FIELD OF THE INVENTION

This invention relates to a multi-user information and analysis system to support the investigation of classes of occurrences, such as mishaps and accidents.

BACKGROUND OF THE INVENTION

Today, a wide variety of different media and different instruments are used to record evidence relating to mishaps and accidents. This evidence may be collected and stored at remote locations and can include the information in handwritten notes, e-mail, text documents, taped or transcribed interviews with witnesses, other multi-formatted data files, and images generated by software and/or hardware. The collection, organization and integration of such evidence are difficult, time consuming processes for the investigating team. These processes are necessary, however, to enable the most important investigation process—understanding the relevance and relationships within the evidence and information. When a mishap or accident (referred to collectively herein as a "mishap") is investigated by a team that is geographically dispersed, information management and coordination problems are particularly acute. Few systems have been developed that can support these fundamental investigation processes.

What is needed is a system that facilitates organization, collaboration and communication between two or more system users, who may be but need not be remote from each other, for data gathering for, and analysis of, a class of events, such as mishaps. Preferably, the system should be available on an intra-net or internet system and the messages should preserve confidentiality, encourage unconstrained communication between users and preserve process integrity.

SUMMARY OF THE INVENTION

These needs are met by the invention, which enables key elements of successful investigation, including: (1) gathering and sharing disparate types of information; (2) identifying the relationships between different information items; (3) understanding the significance of such relationships; and (4) preserving the chain of evidence. The invention facilitates the first of these elements through a Web-based application that can be accessed by one user or by a geographically dispersed team of users, to classify, store, retrieve and display any type of digitally expressed investigation material in a secure environment, and to catalog and track physical evidence and documents. The second element is facilitated by defining an ontology of different types of investigation-relevant record types (referred to herein as ontology "classes") and their interrelationships ("linkages"). The ontology forms the basis for a semantic network structure that literally allows an investigator team to "connect the dots" through use of the linkages. The third element is facilitated through models and tests for causality and consistency, using several methods embedded within the system, including but not limited to fault trees, event sequences and other accident characterization models. The evidence gathered and structured through use of the invention can be directly and electronically archived to preserve the evidence and investigative reasoning.

The customizable or reconfigurable ontology that forms the basis of the semantic network structure specifies and permits instantiation of ontology classes (e.g., persons, locations, events, causes, associated projects, systems and associated information products) that are relevant to the mishap investigation. The ontology also describes important properties and a range of parameter values, where relevant, of each class and indicates potential relationships between two or more such classes. Instantiations stored in the repository are classified and indexed according to the ontology.

A user, such as an investigator of a mishap, can specify properties of one or more stored instantiations and can associate one or more relevant electronic files with an item, manually and/or automatically. A user can establish a link between two or more instantiations based on one or more relationships set forth in the ontology, and the instantiation or related instantiations can be viewed using the hypermedia browser, using the established links to navigate through the space of interrelated items. A user can create and view a proposed or accepted analysis model that specifies causal vectors or hypothesized mishap sequences that may have contributed to, or led to, a target event (e.g., a mishap) under investigation. A causal model is linked to one or more repository instantiations that provide evidence to support or refute the hypothesized cause(s) of the target event (the mishap). The models can be viewed with linear, hierarchical and network diagrams displayed by the user interface. Probabilities and correlations are assignable to and between causes and/or contributing factors, and to alternative consequences of causes and/or contributing factors, of a mishap in a risk analysis.

The system supports: simultaneous evidence gathering at multiple, geographically distributed sites; dynamic reforming of investigation teams and/or objectives; time-critical data searching, collection, testing and analysis; complex and differing organizational environments; different biases; use of multiple models; managing and tracking of investigation progress and status; and heterogeneous data collection, processing, cataloging, tracking and distribution.

A key objective of the invention is to enable distributed teams of users to better organize, represent and analyze data collected, identify correlations between data items, and identify evidence and inferences drawn from such data, through implementation of a methodology for investigating mishaps. Another objective is to integrate and allow visualization of data within a context of graphically presented and analyzed data, intermediate results and final results.

In a typical situation, one or more analytical models are developed by team members to describe or explain part or all of the mishap and to drive the investigation process. The modeling process may involve a fault tree analysis and/or a mishap oversight risk tree (MORT) diagram, which decompose the mishap or accident into different tiers or levels of detail. The team may also characterize an event as a sequence of sub-events that are believed to have contributed to the mishap. Alternatively, features and parameter values in similar situations, in which the mishap did not occur, or occurred in a different manner, may be compared with corresponding features and parameter values in the mishap to identify changes in situation parameters that may have contributed to the mishap. These approaches, their characteristics and available data are integrated by the system and made available to all team members.

BRIEF DESCRIPTION OF THE DRAWINGS

FIGS. 5A, 5B and 5C illustrate browser interface screens for a particular investigation project, involving an improper preload of bolts on a canard rotor wing attachment.

FIG. 6 illustrates some rules applicable to link establishment.

FIGS. 11, 12 and 13 provide more detailed views of visual presentations associated with a fault tree analysis and an event sequence analysis.

DESCRIPTION OF BEST MODES OF THE INVENTION

Figure 1:
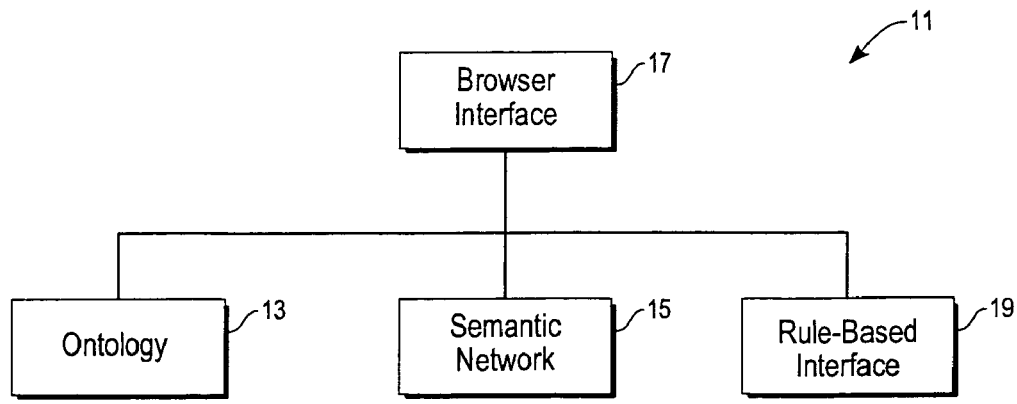
FIG. 1 is a high level view of a system suitable for practicing the invention.

FIG. 1 illustrates a system 11 for practicing the invention. The system 11 includes a reconfigurable ontology module 13 that includes a list of ontology classes (e.g., persons, locations, events, causes, associated projects, systems and associated information products) relevant to the target event(s) (e.g., a mishap). Each ontology class in the ontology module 13 has one or more definitions or properties of each ontology class and a range of values of each ontology class, where relevant and available.

The system 11 includes a semantic network 15 that receives, indexes and stores, for subsequent retrieval, the definitions, properties and/or value ranges of instances of the ontology classes, and that provides a link or relationship between each ontology class instance and one or more other instances. The semantic network 15 serves as a database, as an instantiator for characterization of the target event(s, and as a collaborative workspace for two or more users. The system 11 includes a network browser interface 17 that provides a procedure for storing, for calling up and for presenting, in graphical, alphanumeric and/or audio format, information on the instances stored in the semantic network 15. The system 11 also includes a rule-based inference engine 19, including a collection of at least two rules or syllogism procedures, applicable to at least two classes, which can be used to automatically establish a link or relationship between two or more instances, or to establish new instances or property values.

Figure 2:
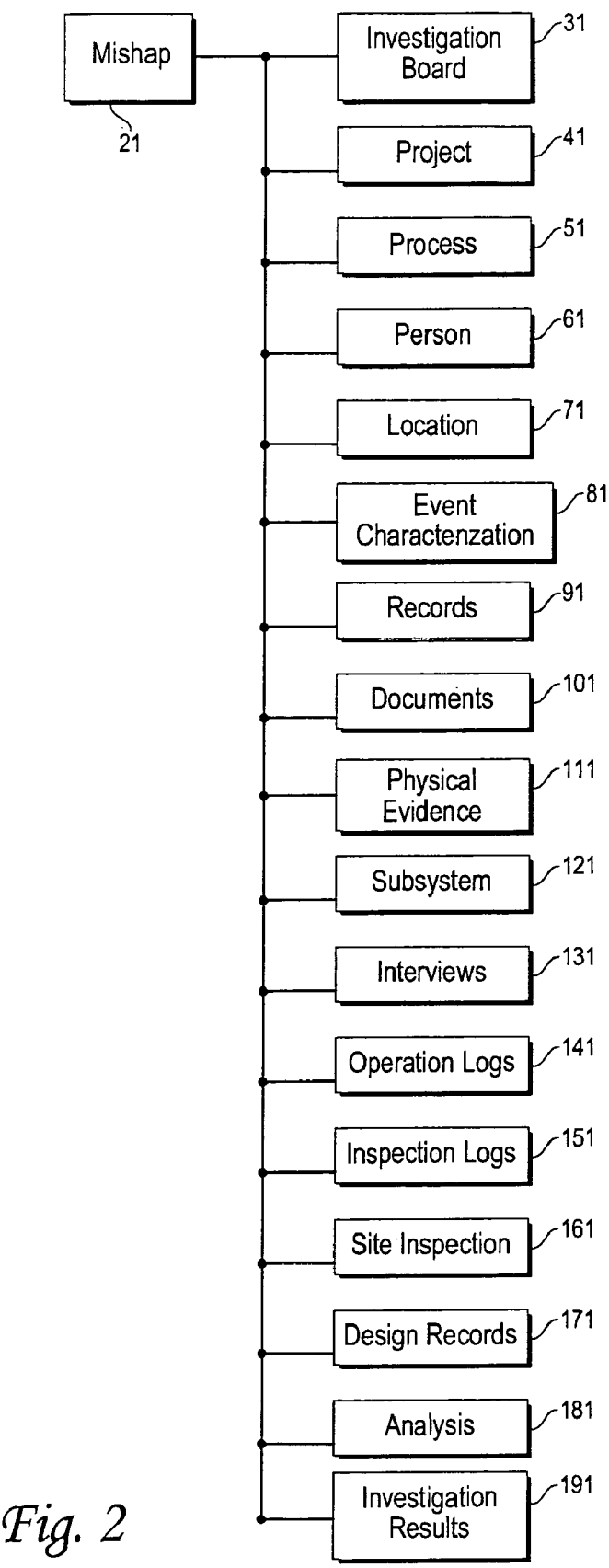
FIG. 2 illustrates kinds of information that can be represented and linked using the invention.

FIG. 2 illustrates some of the kinds of information that can be stored, represented, displayed, indexed and selectively linked to each other. A mishap 21 is optionally linked to one or more of the following: an investigation board class 31, a project class 41, a process class 51, a person class 61, a location class 71, an event characterization class 81, a records class 91, a documents class 101, a physical evidence class 111, a sub-system class 121 and an analysis class 131, and an investigation results class 141.

The investigation board class 31 can be linked to material on meetings and meeting agendas 32, receipt or generation of requests for information 33, individual investigator information 34, investigation procedures 35 and investigation report(s) 36.

The project class 41 includes material on the project or projects under which the mishap occurred, including project controls 42, project plans 43, project procedures 44, project reviews 45, project mission 46, mission timeline 47, mission description 48 and mission requirements 49.

The process class 51 includes material on process description 52, process controls actually implemented 53, and standard operating procedures (SOPs) for the process 54.

The person class 61 includes material on each person 62 involved in, or responsible for events leading directly for the mishap, the group or other unit 63 to which the person belongs, the person's normal responsibilities 64, identification of each event participant 65, identification of each investigator 66 and the task(s) for each investigator 67.

The location class 71 includes material on the location(s) 72 at which the mishap occurred, any other location(s) 73 affected by the mishap, changes recommended for any location(s) 74 as a result of investigation of the mishap, location (s) 75 of each evidence processing site, and location(s) 76 of each record impound site.

The event characterization class 81 includes material on type of mishap event 82, immediate consequences 83 of the mishap, indirect consequences 84 of the mishap, speculative or confirmed factors 85 that contributed to the mishap, and recommended changes in procedures and/or equipment 86 to avoid or reduce the likelihood of another occurrence of the mishap or of any related event.

The records class 91 includes location(s) 92 of each relevant written or published document, location(s) 93 of each relevant audibly perceptible record, location(s), location(s) 94 of each relevant visually perceptible record, and identification 95 of any anomalies in the records.

The documents class 101 includes material 102 on each relevant agreement respecting the project, analysis report records 103, incident report records 104, personnel performance records 105, training records 106, project control procedures and records 107, review documents 108 and other documents 109.

The physical evidence class 111 includes information 112 on debris produced in connection with the mishap and other physical evidence 113.

The sub-system class 121 includes material on design and review records 122, design analysis 123, preceding mishap records 124, risk assessments associated with relevant parameters 125, sub-systems affected by the mishap 126, test and verification records 127, and integration records 128.

The interviews class 131 includes information 132 developed by direct query of an interviewee, information 133 developed subsequently as a result of one or more responses by an interviewee, and physical evidence and related information 134 provided by an interviewee.

The operations log class 141 includes records and quantitative measurements 142 taken during one or more operations at times preceding, or at the time of, the mishap.

The inspections log class 151 includes the results 152 of visual and other inspections made at times preceding, or at the time of, the mishap.

The site inspection class 161 includes the results 162 of one or more inspections of a site of the mishap, after the mishap has occurred.

The design records class 171 includes information 172 obtained from records of design and/or material parameters of one or more components that may have contributed to the mishap.

The analysis class 181 includes material on results of application of fault tree analysis 182, results on application of MORT analysis 183, results on application of event sequence analysis 184, and results from differential comparison of parameters associated with the mishap and corresponding parameters in similar situations where no mishap occurred 185.

The investigation results class 191 includes information 192 on background facts, information 193 concerning findings of fact, information 194 on recommendations resulting from the investigation, and other results 195 of the investigation.

Figure 8:
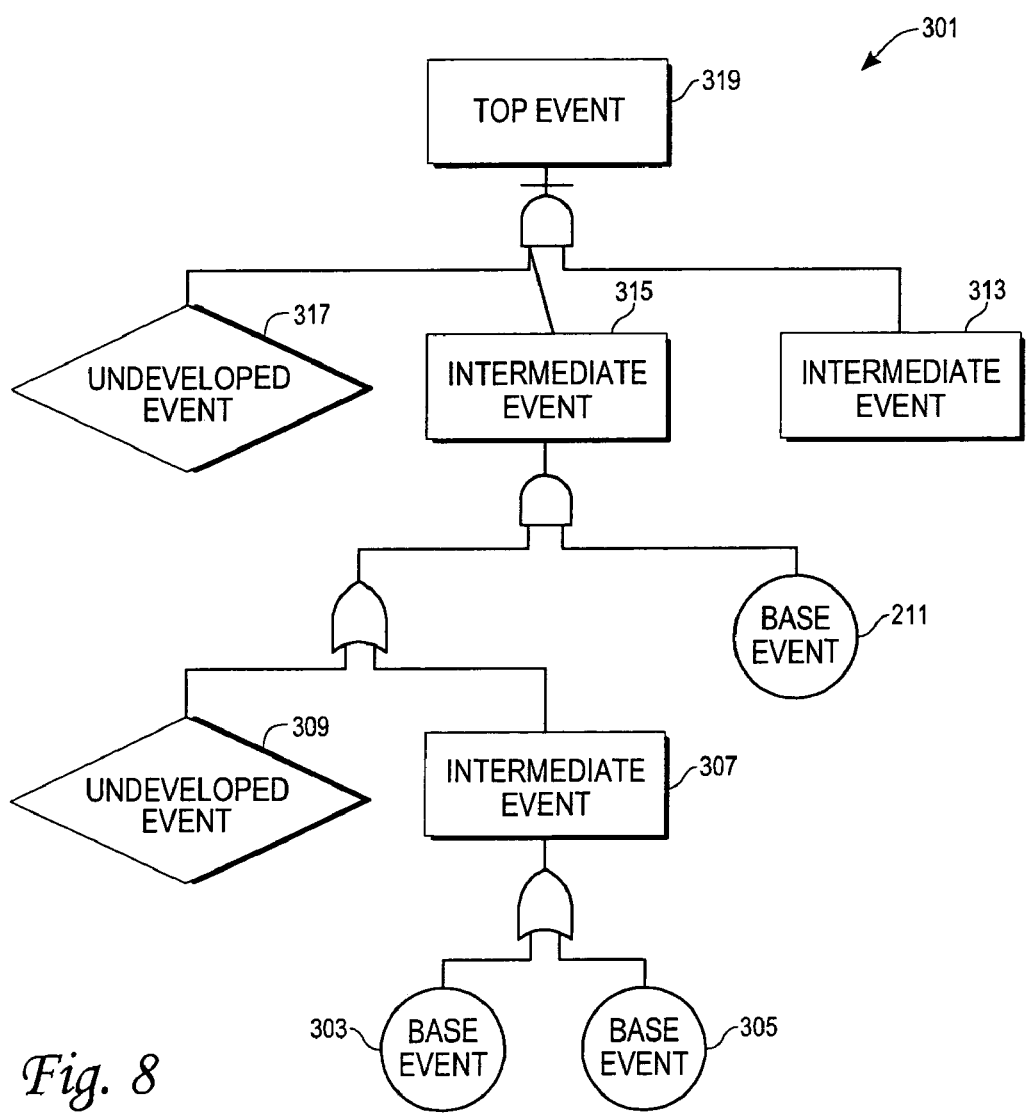
FIGS. 8, 9A, 9B and 10 illustrate a fault tree analysis, an event sequence analysis and a multi-linear event sequence analysis, respectively.
Figure 3:
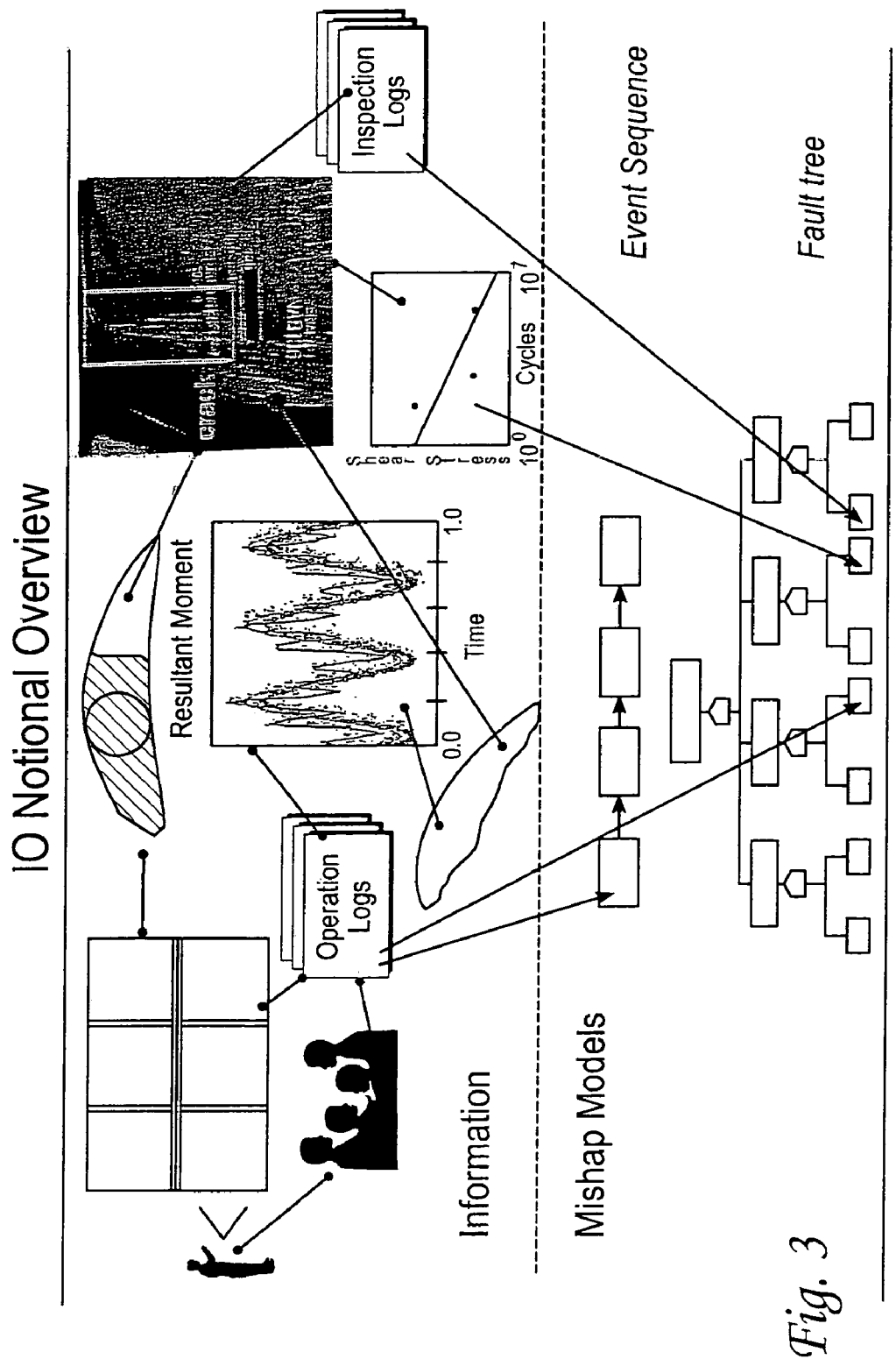
FIG. 3 illustrates how the system supports links between different types of data.

The investigation may rely upon at least seven types of information concerning the mishap: operation logs (before, during and/or after the event); design records of equipment and components associated with the event; records of fabrication of equipment and/or components actually involved in the mishap; interviews with persons who witnessed the event or who inspected the equipment and components before and/or after the event; inspection and maintenance logs that were prepared before and/or after the event; physical evidence, including but not limited to photographs and photomicrographs and chemical analyses of the equipment and components; and results of experiments performed on similar systems before and/or after the event FIG. 3 illustrates a typical set of relationships among a subset of the information classes set forth in FIG. 2 and an event sequence analysis (FIGS. 9A, 9B and 10) or a fault tree analysis (FIG. 8). In FIG. 3, interviews, operation logs, and quantitative graphical presentations contribute to an event sequence analysis; and operations logs, inspection logs, formal records and documents, quantitative graphical presentations and microphotographs contribute to a fault tree analysis.

Figure 4:
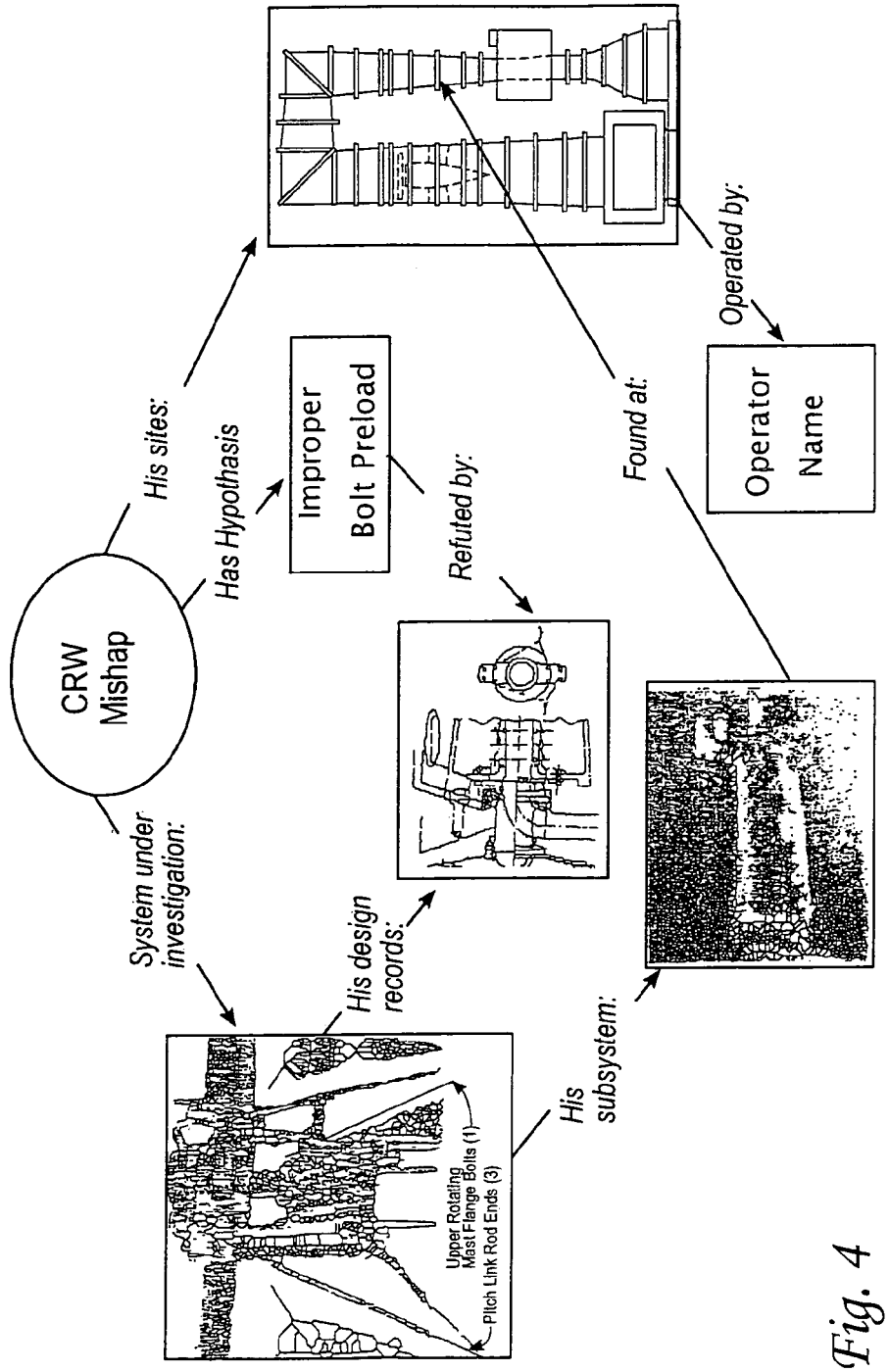
FIG. 4 illustrates contribution of information from various sources to a particular mishap investigation.

FIG. 4 illustrates an example of linkages of correlated information, as implemented by the invention, applied to a particular (CRW) mishap. Investigation of this mishap relies upon, among other things, inspection of the site, inspection of the components and subsystems, examination of design records of the components and operation logs. This investigation has at least one hypothesis (improper bolt preload) that is refuted by examination of the design records for the system.

FIG. 5A is an example of an investigation organizer user interface screen 201, illustrating its use in an investigation of physical evidence (debris) collected following a mishap involving improper preloading of bolts on a canard rotor wing blade attachment. This interface allows a user to view one instance (Blade Attach Fitting #1) on a right portion 201-R of the screen and to view established other instances or features with established links to the viewed instance on a left portion 201-L of the screen.

A user can navigate through the information network, using a sequence of links, view metadata associated with a given instance or instances, search for specific records, and enter new data and/or modify extant data (with suitable safeguards imposed), using the interface 201. In the example, descriptor items relating directly to the item of physical evidence, Blade Attach Fitting #1, such as description, identifying number, record creation date, collected by, date of last record update, responsible group, investigation incident, supports, are displayed on the right portion 201-R of the screen. Note that not all of the descriptor items shown on the right portion 201-R of the screen may have information available and displayed.

In the particular example in FIG. 5A, links are provided from the debris instantiation (part of physical evidence) to the following other instantiations: Liam G. Man, as collector and as custodian; five analysis report records that provide the results of analysis of this physical evidence item; the subsystem (Blade Attach Assembly #1) with which the physical evidence item is identified; ten photos taken of the physical evidence item; a debris map showing the location where the physical evidence item was collected; the responsible group for this investigation; an investigation in which this physical evidence item is involved; and a hypothesis supported by the physical evidence item. When a user activates a link to a instance shown on the left portion 201-L of the screen, such as the debris map instance shown in FIG. 5A, the interface displays that (linked) instance and its metadata on the right portion 201-R of the screen and also displays links to the displayed instance, including the link to the original instance, Blade Attach Fitting #1

Figure 5B:
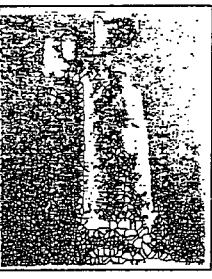
Figure 5C:
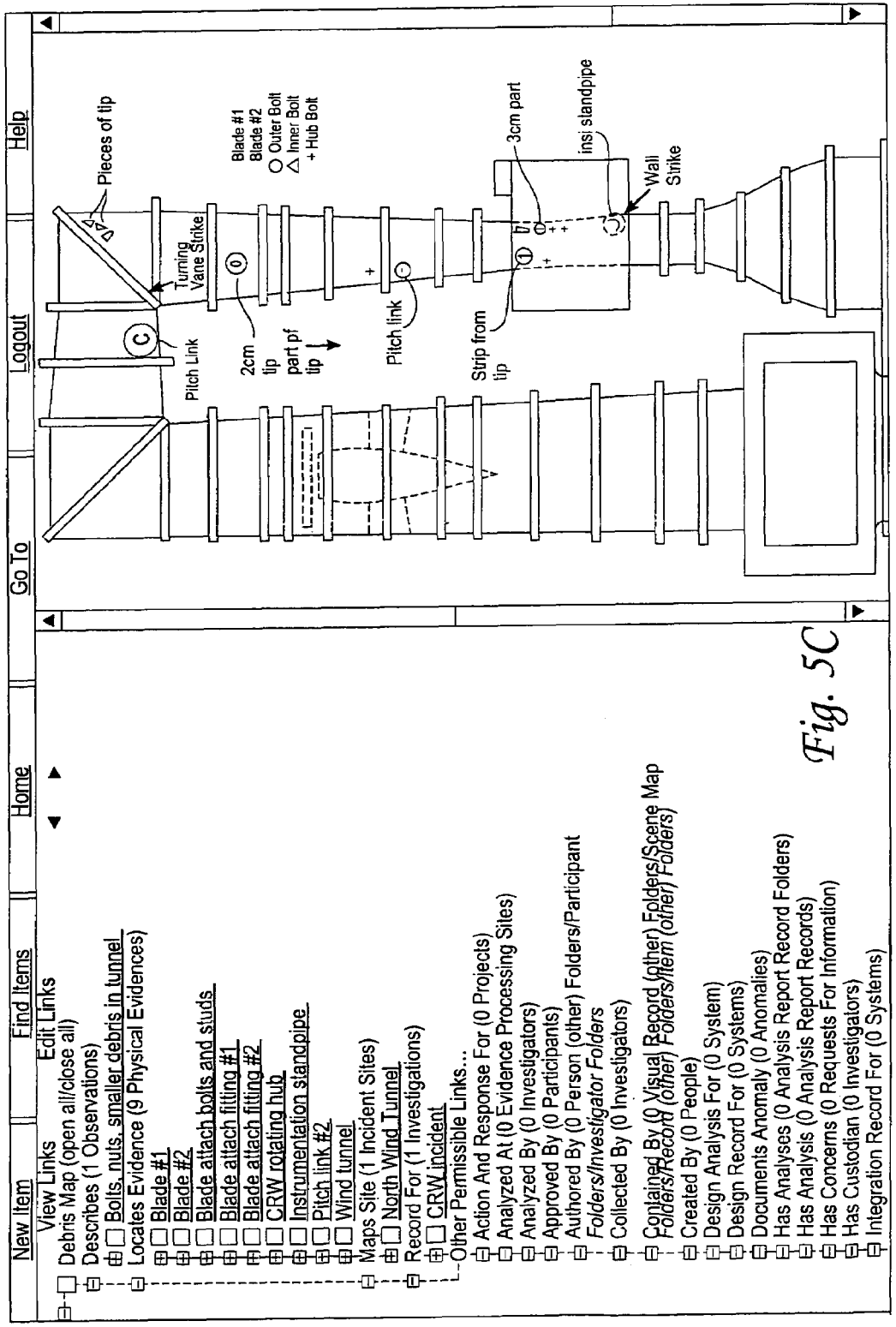

Other interface images associated with the alphanumeric data presented in FIG. 5A include a photomicrograph of the failure region of the fitting, and a debris map of the fitting, shown in FIGS. 5B and 5C, respectively.

When a user clicks on and activates a instance link, the interface displays the instance description on the right portion and links to the chosen instance on the left portion, as in FIG. 5A. Links to each instance are explicitly stored and displayed so that a user need not rely upon human memory to provide such links. This avoids the difficulties present when a user is unfamiliar with the scope of the program or its details, when the user has not used the program recently, or when the user has a large quantity of unrelated heterogeneous information to maintain. Links of a given instance to other instances are shared by all users of the interface.

Modification of information associated with a instance or with a instance link is treated as follows. Where a new instance is introduced, the user, or an automated system, may add one or more links between the new instance and one or more extant instances. Where a link that already exists is to be deleted, deletion of the link does not delete any instance connected by the link, although a new link may need to be established: each instance should have a link or relationship with at least one other instance. Information added to a instance is parsed, optionally using the rule-based inference engine, to determine if one or more additional links should be added to the list of links or relationships. Information deleted from an instance may have the opposite effect, wherein one or more links associated with that instance is deleted.

FIG. 6 indicates some basic rules that are applied by the rule-based inference engine 19 (FIG. 1) to determine whether a link or relationship should be established between two instances.

Another interface component allows users to collaboratively view and annotate images stored in the repository. Another interface component allows Microsoft Office users to save Office files directly into the repository. Another interface component allows a user to establish an e-mail distribution list, where messages and attachments (each treated as a instance) sent to recipients are integrated automatically into the repository, with user-defined or automatically-defined links.

The system includes a framework and graphical tools for causal modeling, including fault tree analysis for displaying relationships between, and a timeline of, events that may have contributed to one or more target events.

A. D. Livingston, G. Jackson and K. Priestley, in "Root causes analysis: Literature review," published by Health & Safety Executive Books, Her Majesty's Stationery Office, 2001, summarize each of about 11 root cause analysis approaches. A "root cause" is defined, for purposes of this book as "the most basic cause the can be reasonably identified and that management has control to fix."

For purposes of this discussion: an "event" is a real time occurrence, describing one discrete action, such as an error committed, a failure or a malfunction; a "condition" is an as-found state, whether or not resulting from an identified event, that may have health, safety, quality, security, operational or environmental implications; a "barrier" is a physical device or administrative control that is used to eliminate, or to reduce to an acceptable level, the risk of an undesired outcome; a "contributing factor" is an event or condition that may have contributed to the outcome but whose modification or elimination would not, by itself, have prevented the outcome; and an "organizational factor" is any operational or management structural entity that exerts control over the system at at least one stage in the system's cycle, including but not limited to the system's conception, development, design, fabrication, test, maintenance, operation and disposal.

In mishap analysis, one usually distinguishes between a proximate cause, an intermediate cause and a root cause. A suitable definition of a "proximate cause" or "direct cause" is:

"the event(s) that occurred, including any condition(s) that existed immediately before the undesired outcome, directly resulted from its occurrence, and, if this event were eliminated or modified, would have prevented the undesirable outcome."A proximate cause may be characterized as a cause that occurs immediately or directly before the undesired outcome. Examples of undesirable outcomes include failure, anomaly, schedule delay, broken or dysfunctional equipment, product defect, close call and mishap.

A suitable definition for a "root cause", which is adopted here, is:

"one or more factors (events, conditions or organizational factors) that contributed to or created the proximate cause and subsequent undesired outcome and, if this factor were eliminated or modified, would have prevented the undesired outcome."

An intermediate cause occurs between a root cause and a proximate cause.

A root cause analysis (RCA) is a structured evaluation method or protocol that identifies the root cause(s) for an undesired outcome and actions that are adequate to prevent recurrence of the undesired outcome. Root cause analysis should continue until all relevant organizational factors have been identified, or until relevant data are exhausted. Ideally, an RCA helps a user determine what happened, how it happened, why it happened, and how it may be avoided in the future. An objective of RCA is to identify root causes so that these latent failures can be eliminated or modified to prevent future occurrences of similar problems. If an RCA is not performed, a user may only identify and remedy the proximate causes of a mishap or problem, and the underlying cause(s) may continue to produce similar problems or mishaps in the same or related areas.

Figure 7:
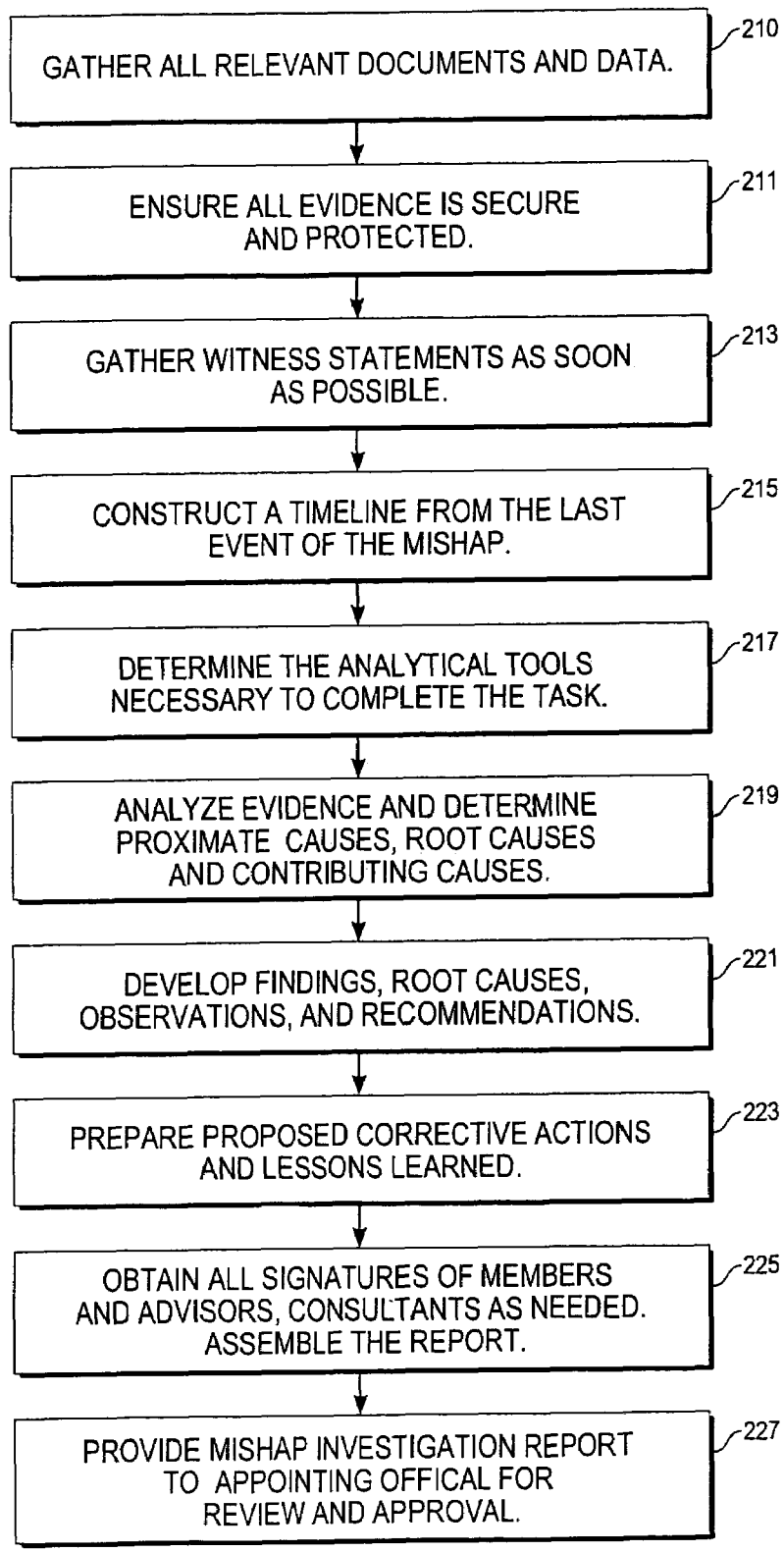
FIG. 7 is a flow chart for performing a root cause analysis.

FIG. 7 is a flow chart of a suitable procedure for performing a root cause analysis. In step 210, all documents, data and physical evidence relevant to the mishap are gathered. In step 211, one ensures that all evidence (including documents, data and physical evidence is secure and protected against compromise and/or theft. In step 213, witness statements relevant to the mishap are gathered as soon as possible. In step 215, a timeline is constructed beginning from the last event that is part of the mishap. In step 217, the analytical tools that are necessary or appropriate to complete the investigation are identified. In step 219, evidence is analyzed and root causes, proximate causes and contributing causes are determined. Optionally, this includes generation of one or more solutions that identify root, proximate and contributing causes. In step 221, findings, root causes, observations and recommendations are developed. In step 223, one or more corrective actions and lessons learned are identified (optional) in response to receipt of a task statement that explicitly requests this. In step 225 (optional) signatures and approvals of members, advisors and consultants for the mishap investigation are obtained, and a report is assembled. In step 227 (optional), a mishap investigation report is provided for review, comment and approval.

With reference to step 210, the user preferably determines one or more of the following facts concerning the undesirable outcome: (1) When did the outcome occur; (2) Where did the outcome occur; (3) What conditions were present before occurrence of the outcome; (4) What controls or barriers could have prevented the outcome, but did not; (5) Why did the controls or barriers not prevent the outcome; (6) What are all the potential causes of the outcome; and (7) What changes can be made in the system, equipment, protocols and/or training to prevent recurrence of the outcome?

With reference to step 219, a root cause should take account of any organizational factor that exerts control over the design, fabrication, development, maintenance, operation and/or disposal within the system. A problem that is not at least partly correctable by the user's organization does not qualify as a root cause.

A fault tree analysis (FTA) is a graphic model that displays and connects logical combinations of failures that can result in an incident, such as a mishap. The combinations include equipment failures, human errors and management system failures. A fault tree begins with a "top event," usually a specific undesired event, such as a mishap or system condition. The top event is then decomposed into contributing events that are structured according to specified rules and logic. After the fault tree structure is completed, different connected events are analyzed to determine what combination(s) of failures are likely to have caused the top event. One aim of the FTA is to identify a "minimal cut set," a group of basic events that will cause the top event to occur. A first order cut is a basic event that will, by itself, cause the top event to occur (with probability substantially equal to 1). An Nth order cut is a connected set of N events (N>2) that will cause the top event to occur, where deletion of any one of the N events will reduce the probability that the top event occurs to a value substantially less than 1, including 0).

An FTA is developed graphically using: base events; undeveloped events (for which no further modeling is possible, with the data available), intermediate events that are contributed to by occurrence of two or more other events; and Boolean connectives such as the binary operators AND, OR and NOT. FIG. 8 illustrates a structure 301 of a simple FTA in which either of first and second base events, 303 and 305, contribute to a first intermediate event 307. Occurrence of the first intermediate event 307 or of a first undeveloped event 309 contributes to a second level occurrence. Presence of the second level occurrence and of a third base event 311 produces a second intermediate event 313. Presence of (all three of) the second intermediate event 313, of a third intermediate event 315, and of a second undeveloped event 317 produces a top event 319. In this illustration, the minimum cut set is third order, requiring occurrence of the second and third intermediate events, 313 and 315, and of the second undeveloped event 317.

An ordered sequence of target events (including, but not limited to, a single event) may incorporate, or lead inexorably to, a particular event, such as a mishap. Each event in the ordered sequence is analyzed, although the particular event may depend primarily on less than all of the target events. One or more events in the ordered sequence may be decomposed into a sub-sequence of two or more subsidiary events, in order to more conveniently analyze the event sequence.

Event sequence analysis (ESA) uses an event sequence diagram, wherein each of a sequence of contributing events is presented on a time line graph. In one format, each event in a sequence is connected to at least one other event in a time line, indicated by horizontal arrows, with primary events on one time line and secondary or tertiary events on a parallel time line. A condition (not qualifying as an event) is connected to an event by a vertical arrow. Each event describes an occurrence or single discrete action, not a condition, and each event is described by a noun or a verb. An occurrence must be precisely described and is quantified, where possible. Events range from a beginning time to an end of the mishap sequence, and each event is derived from a preceding event. An initial version of an event sequence may contain unresolved gaps in the events, and additional information may need to be developed and included.

Figure 9A:
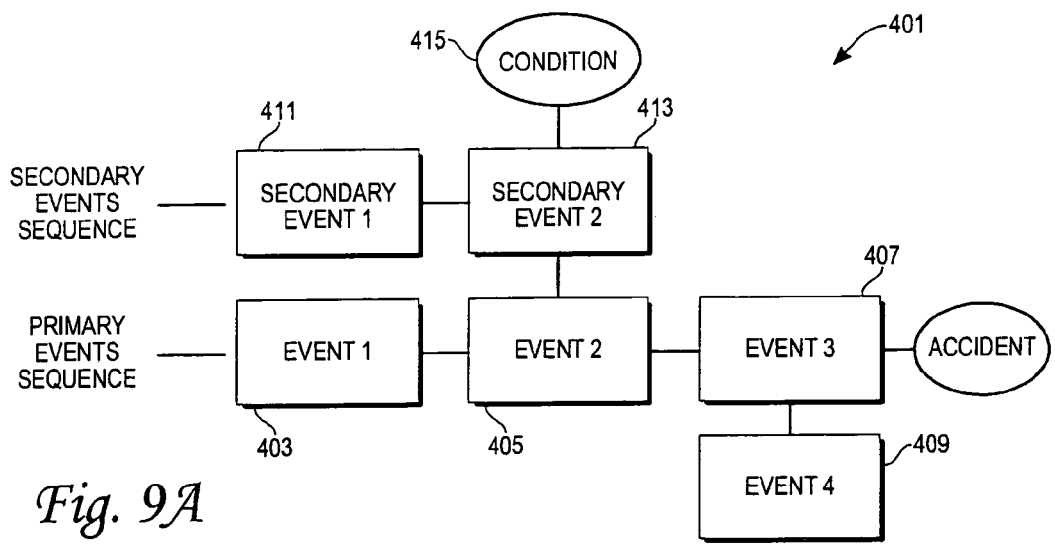
Figure 9B:
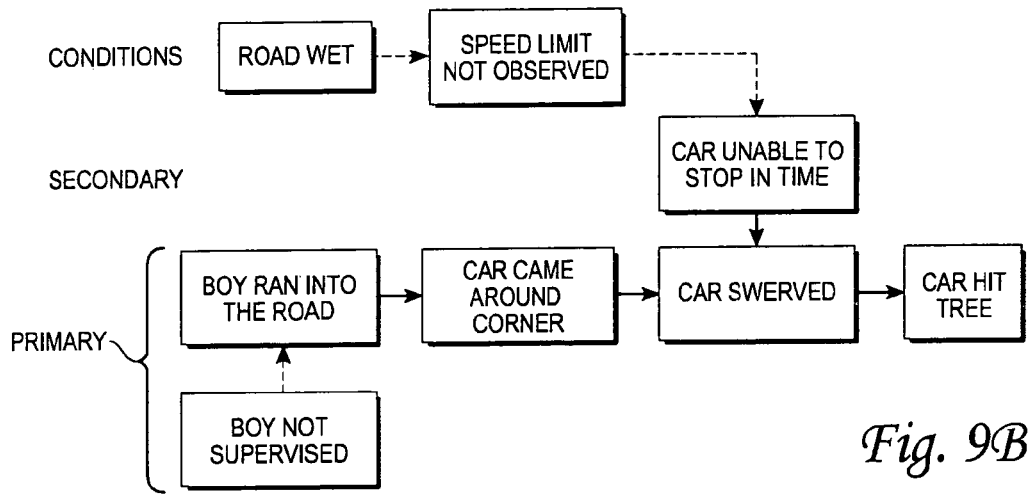

An event sequence analysis (ESA) constructs a diagram with the final event, usually the conclusion of the mishap, and works backward in time by connecting this end point to relevant events that preceded the end point. In a first diagram, only the most immediate contributing events may be included, with other events being added as their relevance becomes clearer. In an event sequence diagram: (1) each event is enclosed in a rectangle; (2) each condition is enclosed in an oval; (3) all conditions are connected to other conditions and/or to events by dotted lines; (4) each event or condition should be based upon valid evidence or indicated to be otherwise by use of a dotted rectangle or dotted oval; (5) A primary sequence of events is shown as a straight horizontal line; (6) secondary event sequences are presented at different levels; and (7) relative time is from left to right; (8) an event must describe an occurrence, not a condition, and must involve one discrete action, described by a noun or verb; (9) an event should be quantified, where possible; (10) events should range from a beginning time point to an end time point of the accident sequence; and (11) each event should be derived from one or more events that precede it in time. FIG. 9A illustrates a typical event sequence diagram 401 having a primary event sequence with first, second, third and fourth primary events, 403, 405, 407 and 409, first and second secondary events, 411 and 413, that together feed into the second primary event 405, and a condition 415 that affects the second secondary event 413. The final result is an accident or mishap 417.

FIG. 7B illustrates an event sequence diagram for a particular mishap, involving a collision of a vehicle with a tree, as the vehicle swerves to avoid contact with a child running into a road on which the vehicle travels.

Figure 10:
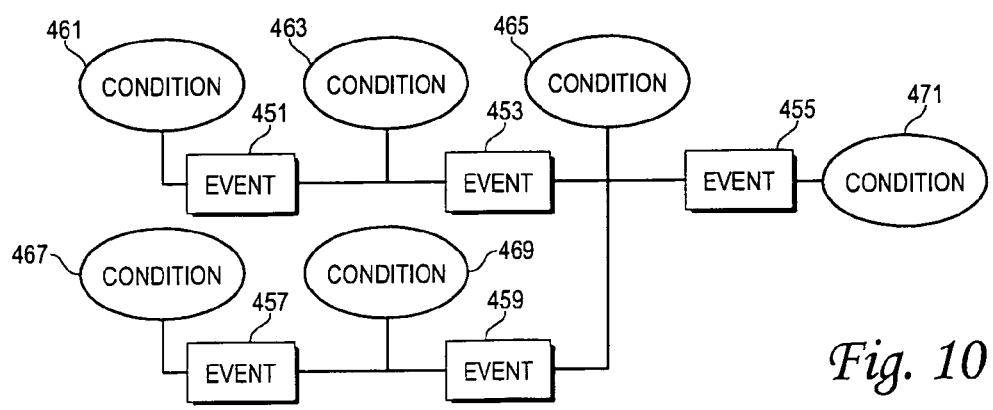

A multi-linear events sequencing analysis (MESA), illustrated in FIG. 10, is an enhancement of the ESA in which primary event sequences can appear on more than one horizontal line. Relevant primary events, 451, 453, 455, 457 and 459, as supported by appropriate conditions, 461, 463, 465, 467 and 469, are joined at appropriate time points with each other to produce an outcome 471.

A management oversight and risk tree (MORT) analysis, in its broadest scope, includes as many as eight interconnecting trees, through which 98 generic problems and at least 200 basic causes can be identified. MORT analysis uses symbols and logic similar to those used in an FTA, with two differences. First, MORT begins with a fault tree that has already been constructed; the user works through the fault tree and discards the branches that are found to be not relevant to the mishap. Second, MORT analyzes what happened during a mishap and traces the causal factors back to management systems and protocols to attempt to identify what or how a contributing event occurred. A MORT analysis works with a diagram or chart already constructed using another root cause approach, such as FTA or event sequence analysis (ESA).

The system optionally provides a link between a root cause, a proximate cause and/or a conclusion (a "position") and each evidence item that supports this position or that refutes this position. This allows a user to evaluate the strength of such a position.

Figure 11:
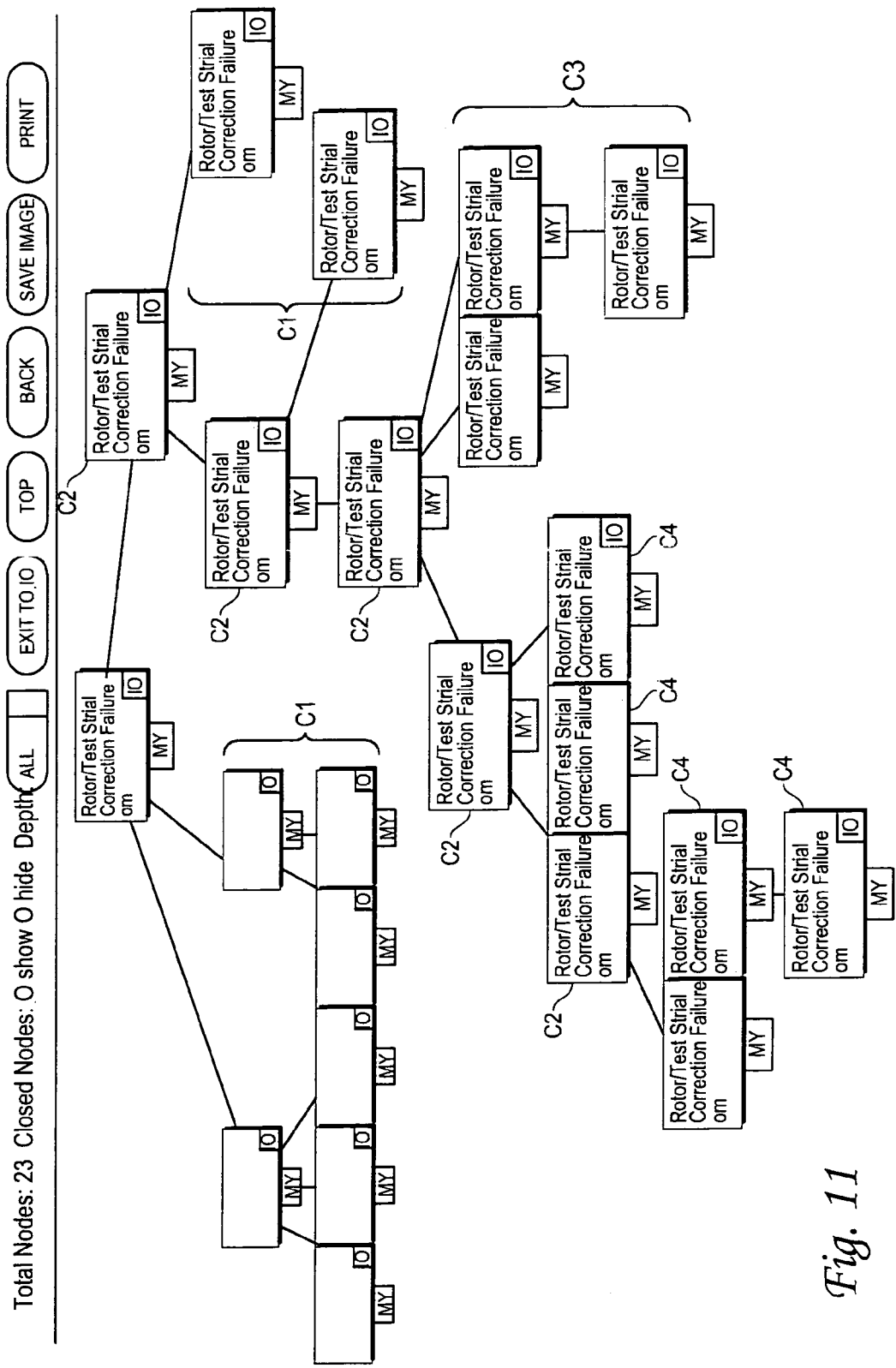

FIG. 11 illustrates a visual presentation of a fault tree analysis intermediate result or final result according to an embodiment of the invention. In this illustration, a rotor test stand connection failure is being analyzed. Each relevant conclusion statement below this root conclusion is connected to the root conclusion by one or more line segments that indicate a direct (support) relationship of the conclusions that appear at each end of the line segment. Each of a group of seven possible conclusions, indicated as C1 on the left (e.g., "connection design flaw," "connection fabrication flaw," etc), has been determined to be not credible. Associated with each of these conclusions is a support symbol a/b, where each of a and b is a non-negative integer. The integers "a" and "b" represent the number of evidence items assembled thus far that support the conclusion and the number of evidence items that refute (or are inconsistent with) this conclusion, respectively. Thus, for example, the symbol 1/0 associated with the conclusion "bearing defective" indicates that one evidence item supports this conclusion and no evidence item refutes this conclusion. On the right side of FIG. 10, each of the conclusions "nominal loads" and "resonance present" (also indicated as C1, with support symbols 0/0) has also been determined to be non-credible. More generally, the system optionally provides a link between a root cause, a proximate cause and/or a conclusion and each evidence item that supports this position or refutes this position.

The handle marked "MV" allows drag-and-drop movement of the attached conclusion box to another location within the illustration. When the user clicks on the handle marked "IO," more detail is provided on the associated conclusion.

On the right side of FIG. 11, each of the conclusions indicated as C2, namely "connection overloaded," "off-nominal loads encountered," "imbalance," "blade retention failure," and "bolts," has corresponding support symbol of 0/0, and these conclusions were not yet reviewed at the time the (intermediate) result presentation shown in FIG. 11 was prepared. Each of the conclusions indicated as C3, namely "(rotor) not properly balanced," "control failure" and "pitch link failure," requires additional data before analysis can proceed. Each of the conclusions indicated as C4, namely "thrust bearing," "flange" and "(bolt) fatigue," are proposed conclusions and the conclusion "(bolt) defective" needs further analysis. The illustration shown in FIG. 11 provides a snapshot of the status of possible conclusions that can be drawn at an intermediate point in the fault tree analysis, beginning with the root conclusion "rotor test stand connection failure."

Each conclusion statement in FIG. 11 is assigned to one (and only one) of the following conclusion categories: conclusion is not credible; conclusion is unlikely; conclusion is credible; conclusion needs analysis; conclusion needs data (for support); conclusion is proposed to be closed; and unreviewed conclusion. These conclusion categories may be supplemented by other categories, and the statement of each category (e.g., conclusion is not credible) can be replaced by words having a similar interpretation.

Figure 12:
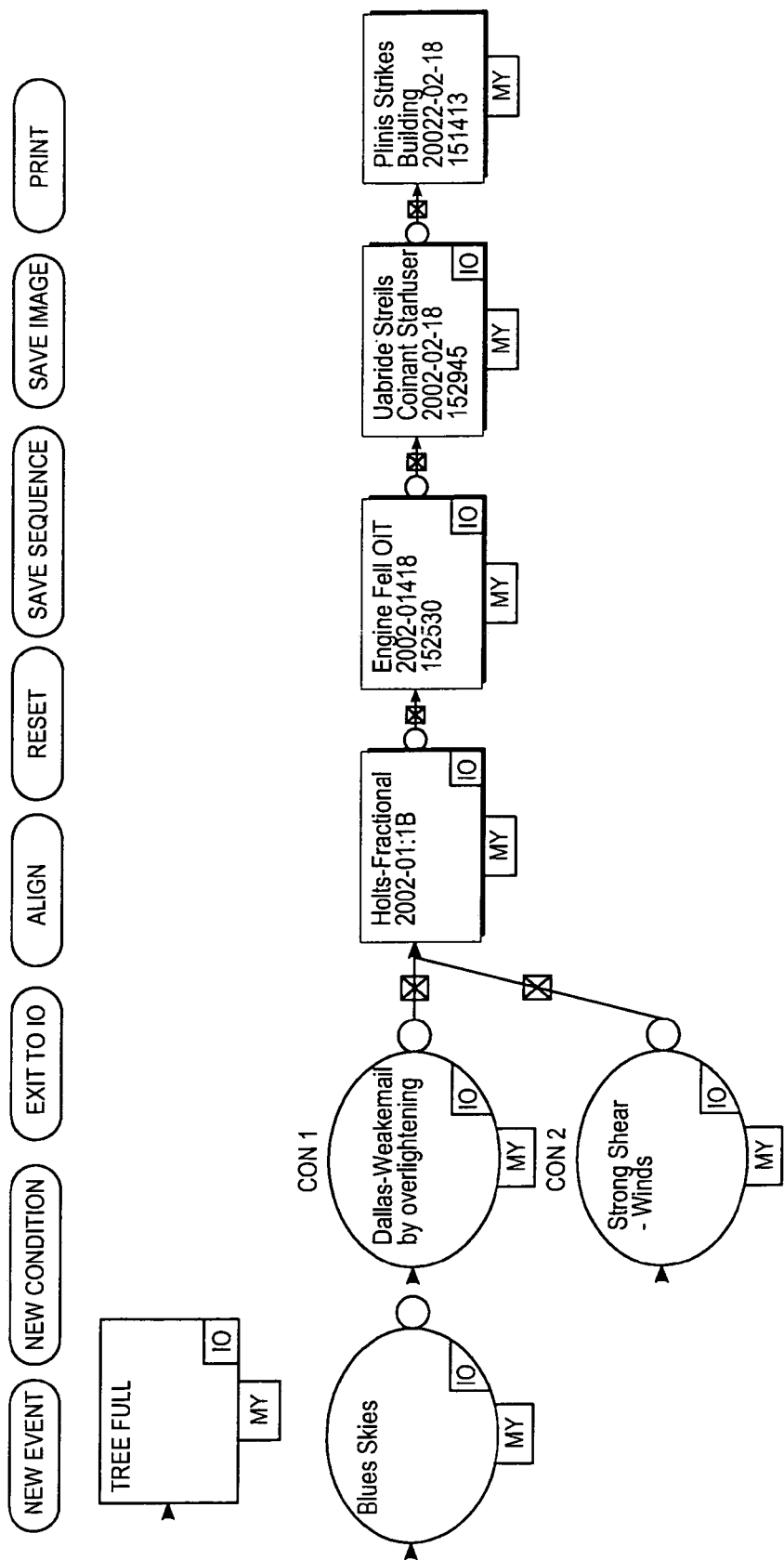

FIG. 12 illustrates a chronological arrangement of condition statements (boxes in an oval format) and event statements (boxes in a rectangular format) in an event sequence analysis. Optionally, each event statement has a date associated therewith. The first and second relevant conditions, Con1 and Con2, shown on the left, are "bolts weakened by tightening"

and "strong shear winds (present)." The effects of these two condition statements combine to produce an event statement "bolts fractured," which is followed chronologically by the event statements "engine fell off," "debris shreds control surfaces (of aircraft)" and "plane strikes building." A condition statement and/or an event statement can be added to, or deleted from, the sequence at any point in the development, using the MV handles to move a condition statement and/or an event statement or to introduce or delete such a statement. This allows inclusion of new or modified information as new information is developed.

Figure 13:
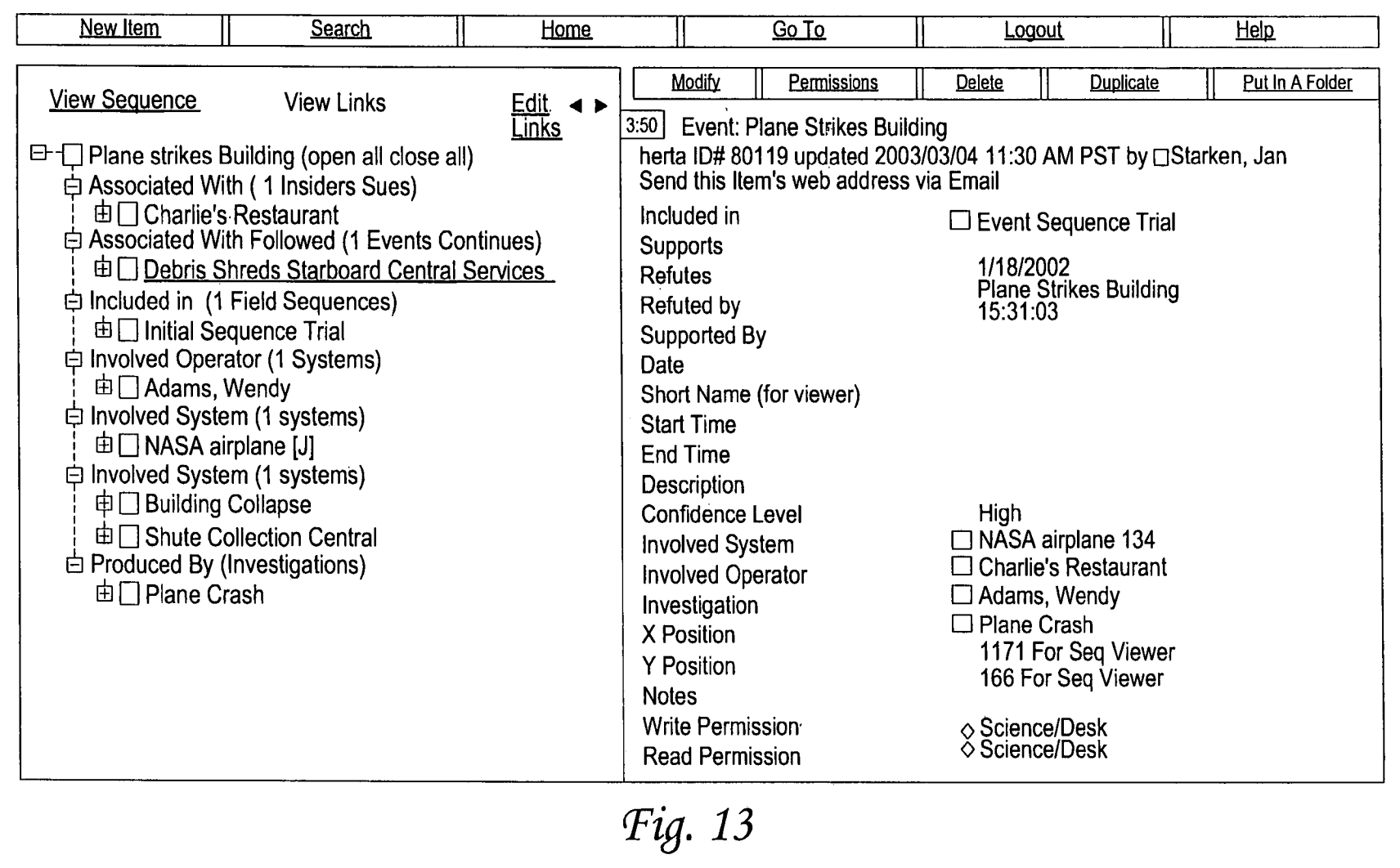

When the user clicks on the handle marked "IO", the screen returns to the standard browser interface where more detail is provided on the associated condition or event. In FIG. 13, the user has clicked on the event "Plane Strikes Building" shown in FIG. 12, and is returned to the standard browser interface displaying this Event. As in FIG. 5A, the right side of the screen in FIG. 13 shows attributes and key relations for this Event. In FIG. 13, these attributes and relations include:

- The unique item ID no. (80119)
- The date and time last modified
- The last person who modified it (Ian Sturken)
- The Event Sequence(s) this Event is a part of
- The date and time the Event occurred
- A shorter name for the event and X and Y coordinates for display in the graphical Event Sequence Viewer
- A confidence level regarding the event's occurrence (high)
- The System(s) and Operator(s) involved in the Event
- The Site where the Event occurred
- The permissions for modifying and viewing this Event FIG. 13 also shows other possible attributes, which were not completed for this particular Event. Additionally, as in FIG. 5A, the left side of the screen shows relations that have been made between this Event and other items in the system. Many more relations are possible, these are merely the ones the investigator for this (fictitious) Event chose to create. In FIG. 13, the Event "Plane Strikes Building":

- is associated with an Incident Site (Charlie's Restaurant);
- is followed an Event (Debris Shreds Starboard Control Surfaces);
- is included in an Event Sequence (Event Sequence Trial);
- involved an Operator (Wendy Adams);
- involved a System (NASA Airplane 134);
- is preceded two other Events (Building Collapse and Data Collection Ceased); and
- was produced by the Plane Crash Investigation The standard browser interface shown in FIG. 13 accepts entry of a variety of commands, which are standard to most items in the system:

- creation of a New Item
- initiating a Search
- returning to the Home item
- Go To a previously viewed item
- Logout from the system
- Help
- Viewing the event Sequence graphical display (this is unique to elements of an Event Sequence)
- Edit the Links to create new relations or delete existing relations
- Modify the Event (name, attributes, and/or key relations)
- change the Permissions on the event
- Delete the Event
- Duplicate the Event
- Put the event In A Folder or by clicking on any other blue underlined hyperlink, go to the standard browser view of that item (e.g. Plane Crash, Building Collapse, Ian Sturken)

Figure 14:
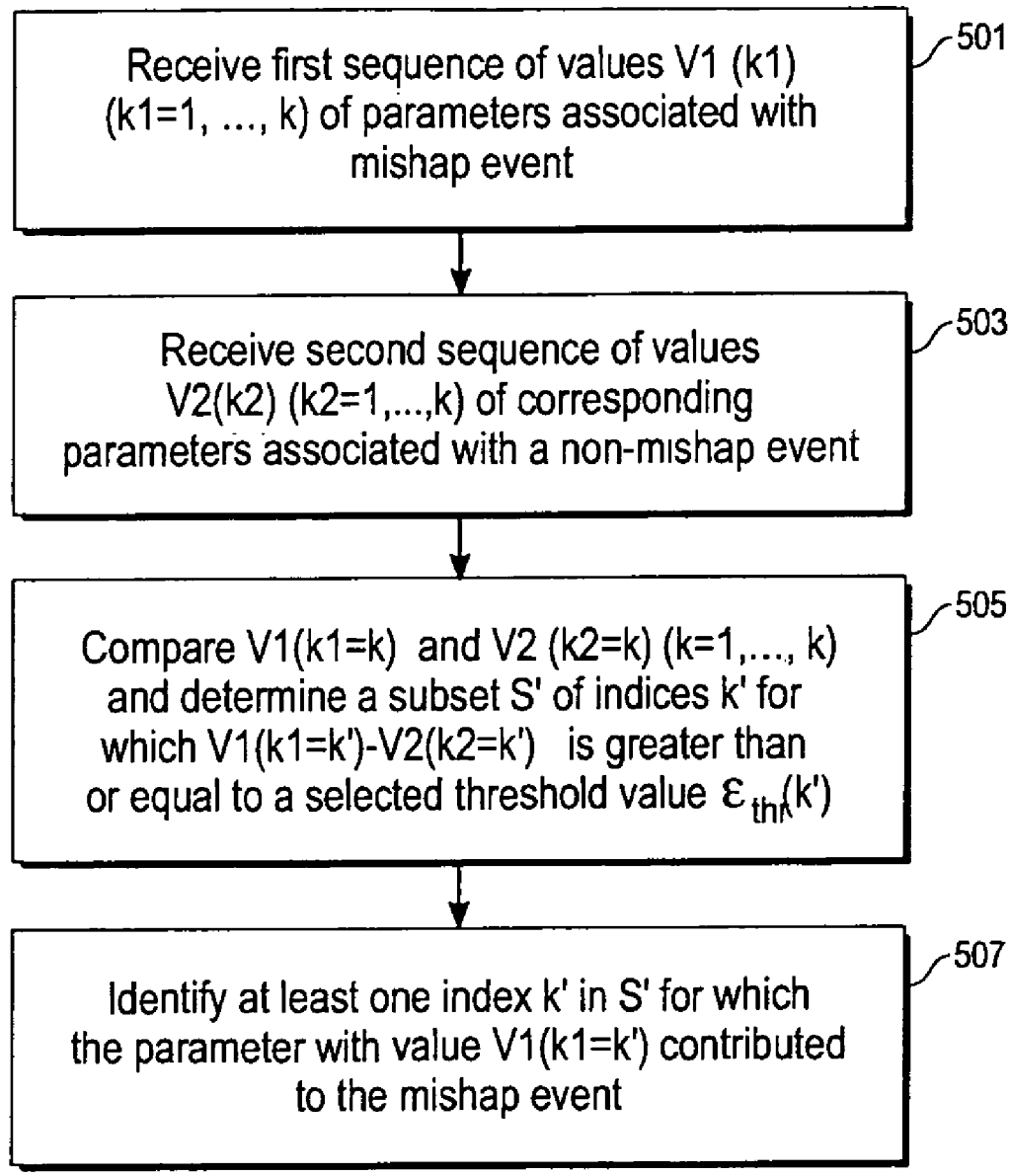
FIG. 14 is a flow chart illustrating a parameter comparison method for analyzing a target event.

FIG. 14 is a flow chart illustrating a method for investigating a target event, such as an event associated with a mishap, by comparing relevant parameter values for each of one or more similar situations in which the target event did not occur with corresponding parameter values for the target event. In step 501, the system receives a first sequence of values v1(k1), numbered k1=1, . . . , K, of K parameters associated with a mishap. In step 503, the system receives a second sequence of values v2(k2), numbered k2=1, . . . , K, corresponding to the first sequence of parameter values and associated at least one non-target event. In step 505, the system compares each parameter value v1(k1=k) for the target event with a corresponding parameter value, v2(k2=k) for the at least one non-target event, and to determine a subset S' of indices k' (1<k'<K) for which parameter differences satisfy a difference criterion, such as $$|v1(k1=k')-v2(k2=k')| \geq \epsilon_{thr}(k'), \quad (1)$$

where $\epsilon_{thr}(k')$ is a selected threshold difference value that may depend upon the index k'. In step 507, the system identifies at least one index k' in the subset S' for which the parameter value v1(k1=k') contributed to occurrence of the target event.

In operation, where two or more spaced apart users simultaneously utilize the system 11, each user has a separate network browser interface 17 that makes use of the ontology 13, the semantic network 15 and the rule-based inference engine 19 shown in FIG. 1. A selected screen, such as that shown in any of FIG. 5A-5C, 11, 12 or 13, can be simultaneously displayed at one, two or more network browser interfaces, for viewing by the users. Where a first user adds, deletes or changes ("modifies") a screen, for example, to add a new attribute and to establish one or more links between the new attribute and selected attributes that are already in place, all screens that are affected by this activity are optionally "frozen" for a selected time-out interval, having a selected temporal length of between 15 and 180 sec, while the modification is set up for implementation. The proposed modification is, or is not, implemented by the system, depending upon a consensus reached by the users. Where first and second users propose modifications at approximately the same time, well known conflict protocols can be used to resolve this. Two spaced apart users of the system 11 may be any distance apart (e.g., between 1 meter and $10^M$ meters (M=1-7) and will communicate by wired or wireless telephonic means, by e-mail, by television means or by any other suitable audibly and/or visually perceptible communication means.

Optionally, each modification in a document is tracked and the date, time, identity of the user-modifier and/or specific modification(s) are determined and archived. This provides an "audit trail" and a chronology for any document that is part of, or contributes to, the investigation report.

What is claimed is:

1. A system for analyzing a mishap that has occurred, the system comprising:

a reconfigurable ontology associated with a selected mishap, including a list of at least first and second ontology classes related to the selected mishap, at least one definition or property for each of the at least two ontology classes, a value range associated with each of the at least two ontology classes, and at least one relationship or link between the at least two ontology classes, wherein at least one of the at least first and second ontology classes includes information on at least one of the following: a collection of one or more persons assembled to investigate the mishap; a project with which the mishap is associated; a process or procedure associated with the mishap; at least one person involved in or responsible one or more events leading directly to the mishap; at least one location or site associated with the mishap; a characterization of the mishap; a record associated with the mishap; a document associated with the mishap; physical evidence associated with the mishap; a value of a parameter that is part of a description associated with the mishap; a characterization or classification of a sub-system associated with the mishap; an interview of at least one person associated with the mishap; a description of at least one operation associated with the mishap; at least one inspection associated with the mishap; at least one design record of at least one component associated with the mishap; an analysis of at least one aspect of the mishap; and at least one result of an investigation of the mishap;

a semantic network that receives, indexes, stores and integrates, for retrieval, the at least two ontology classes, the definition and the value ranges of the at least two ontology classes and the at least one link between the at least two ontology classes;

a network browser interface, having a display screen, that implements a procedure for retrieving and viewing each of the at least two ontology classes in the semantic network, wherein the browser interface (i) displays at least one screen having at least a first group and a second group of possible conclusions concerning a contributing factor to the mishap, where no possible conclusion in the first group also belongs to the second group and (ii) displays at least one conclusion in the first group or in the second group that is characterized as at least one of the following: not a credible conclusion; an unlikely conclusion; a credible conclusion; conclusion needs analysis; conclusion needs supporting data; conclusion proposed to be closed; and an un-reviewed conclusion; and a rule-based inference engine, including a collection of at least two rules, associated with one or more of the at least two ontology classes and applied to support the at least one conclusion displayed in the browser interface.

2. The system of claim 1, wherein said browser interface displays at least one screen having a first screen portion that displays at least one parameter associated with said first ontology class and having a second, simultaneously viewable screen portion that displays at least one additional ontology class that is related or linked to said first ontology class displayed in the first screen portion.

3. The system of claim 1, wherein a link is provided between said at least one conclusion concerning said mishap and at least one item of evidence that supports said at least one conclusion.

4. The system of claim 1, wherein a link is provided between said at least one conclusion concerning said mishap and at least one item of evidence that refutes said at least one conclusion.

5. The system of claim 1, wherein said browser interface displays at least one screen having at least one statement of a condition, displayed in a first format, and at least one statement of an event, displayed in a second format that is distinguishable from the first format, where the at least one condition statement is visually connected to the at least one event statement and at least one final event statement is directly or indirectly visually connected to all condition statements and to all event statements other than a final event statement.

6. The system of claim 1, wherein said browser interface displays at least one screen having at least one view sequence, drawn from a list of view sequences including "included in," "supports," "refutes," "refuted by," "supported by," "date of sequence," "short name description of sequence," "start time of sequence," "end time of sequence," "description of sequence," "confidence level," "involved system," "associated site," "involved operator," "investigation," "x position for sequence," "y position for sequence," "notes," "write permission," and "read permission."

7. The system of claim 1, wherein said information on said collection of persons assembled to investigate said mishap includes information on at least one of the following: at least one meeting agenda for said collection of persons; at least one receipt or generation of request for information associated with said mishap; background on at least one of said collection of persons; at least one investigation procedure implemented by said collection of persons; and at least one investigation report associated with said mishap.

8. The system of claim 1, wherein said information on said project associated with said mishap includes information on at least one of the following: at least one project control; at least one project plan; at least one project procedure; at least one project review; at least one project mission; at least one mission description; at least one mission timeline; and at least one mission requirement.

9. The system of claim 1, wherein said information on said process associated with said mishap includes information on at least one of the following: a description of said process; at least one process control implemented for said process; and at least one operating procedure for said process.

10. The system of claim 1, wherein said information on said at least one person involved in or responsible for said mishap includes information on at least one of the following: background on said at least one person; at least one work group or work unit to which said at least one person belongs; said at least one person's normal work responsibilities; identification of at least one investigator of said mishap; and a statement of at least one task for the at least one investigator of said mishap.

11. The system of claim 1, wherein said information on said location associated with said mishap includes information on at least one of the following: at least one recommendation for said at least one location or site associated with said mishap, as a result of said investigation; location of at least one evidence processing site associated with said mishap; and location of at least one record impound site associated with said mishap.

12. The system of claim 1, wherein said information on said characterization of said mishap event includes information on at least one of the following: type of said mishap; immediate consequences of said mishap; indirect consequences of said mishap; speculative factors that may have contributed to said mishap; confirmed factors that appear to have contributed to said mishap; recommended changes in at least one procedure to avoid or reduce a likelihood of another occurrence of said mishap; and recommended changes in at least one equipment item or component to avoid or reduce the likelihood of another occurrence of said mishap.

13. The system of claim 1, wherein said information on said records associated with said mishap includes information on at least one of the following: at least one relevant written or published or visually perceptible document associated with said mishap; location of at least one written or published document relevant to said mishap; at least one visually perceptible record relevant to said mishap; at least one audibly perceptible record relevant to said mishap; and at least one anomaly in at least one of said records relevant to said mishap.

14. The system of claim 1, wherein said information on documents associated with said mishap includes information on at least one of the following: at least one relevant agreement respecting a project associated with said mishap; at least one analysis report record; at least one incident report record; at least one personnel performance record for at least one person associated with the project; at least one training record for at least one person associated with the project; at least one control procedure for at least one person associated with the project; at least one record of adherence to the at least one control procedure for at least one person associated with the project; and at least one project review document for the project.

15. The system of claim 1, wherein said information on said sub-system of said mishap includes information on at least one of the following: at least one design for a project associated with said mishap; at least one design record for the project; at least one analysis of at least one design for the project; at least one preceding record of a preceding mishap; at least one risk assessment for the project; at least one test and verification record for the project; and at least one integration record for the project.

16. The system of claim 1, wherein said information on analysis of said mishap includes information on at least one of the following: at least one result from application of fault tree analysis to a project associated with said mishap; at least one result from application of MORT analysis to the project; at least one result from application of event sequence analysis to the project; at least one result from application of comparison of at least one parameter for the project and for a similar project in which a mishap did not occur.

17. The system of claim 1, wherein said semantic network comprises a link adjustment mechanism for performing at least one of the following operations: creation of a link between said at least two ontology classes, deletion of a link between said at least first and second ontology classes, and addition of an ontology class and creation of at least one link between the added class and at least one of said at least first and second ontology classes.

18. The system of claim 1, wherein:
said semantic network provides said at least first and second ontology classes, said definition and said value range of said at least first and second ontology classes and said at least one link between said at least first and second ontology classes for each of at least first and second users that are spaced apart by a distance in a range of between 1 meter and 20,000 km; and the first and second users are provided with first and second network browser interfaces, respectively, with each network browser interface providing a procedure for retrieving and viewing each of said at least first and second ontology classes in said semantic network, and each of the first and second users has access to said rule-based inference engine.

19. The system of claim 1, wherein at least one of said ontology, said semantic network, said network browser interface and said inference engine facilitates recording, for retrieval, of at least one of (i) at least one modification is made in at least one document associated with said mishap, (ii) a date and time at which the at least one modification is made and (iii) an identity of a user who makes the at least one modification.

20. A system for analyzing a mishap event that has occurred, the system comprising a computer that is programmed:
to receive a first sequence of values v1(k1), numbered k1=1, . . . , K, of K parameters associated with a mishap event;
to receive a second sequence of values v2(k2), numbered k2=1, . . . , K, corresponding to the first sequence of parameter values and associated at least one non-mishap event;
to compare each parameter value v1(k1=k) for the mishap event with a corresponding parameter value, v2(k2=k) for the at least one non-mishap event, and to determine and to display on a screen a subset S' of indices k' ($1 \leq k' \leq K$) for which parameter differences satisfy a difference criterion $$|v1(k1=k')-v2(k2=k')| \geq \epsilon_{thr}(k'),$$

where $\epsilon_{thr}(k')$ is a selected threshold difference value that may depend upon the index k'; and
to identify at least one index value, k'=k", in the subset S' for which the parameter value v1(k1=k") contributed to occurrence of the mishap event, and to display a characterization of the parameter with the index value k'=k".

21. The system of claim 20, wherein said system identifies said at least one index k' in said subset S' for which said parameter value v1(k1=k') contributed to occurrence of said mishap event by comparing a value of each of a sequence of functions $$F_{k'}\{|v1(k1=k')-v2(k2=k')|\}$$

for each of said indices k' in said subset S', where $F_{k'}\{u\}$ is a monotonically increasing function of its argument u.

* * * * *

UNITED STATES PATENT AND TRADEMARK OFFICE
CERTIFICATE OF CORRECTION

PATENT NO. : 7,590,606 B1  Page 1 of 1
APPLICATION NO. : 10/703039
DATED : September 15, 2009
INVENTOR(S) : Keller et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 907 days.

Signed and Sealed this

Fourteenth Day of December, 2010

David J. Kappos
*Director of the United States Patent and Trademark Office*